United States Patent [19]

Ellingson et al.

[11] Patent Number: 4,952,072
[45] Date of Patent: Aug. 28, 1990

[54] SYSTEM AND METHOD FOR REMOVING AND CONSOLIDATION FUEL RODS OF A NUCLEAR FUEL ASSEMBLY

[75] Inventors: Frederick J. Ellingson; Anoop Kapoor; Arthur W. Kramer, all of Murrysville Boro; Donald G. Sherwood, Monroeville Boro, all of Pa.

[73] Assignee: Westinghouse Electric Corp., Pittsburgh, Pa.

[21] Appl. No.: 311,435

[22] Filed: Feb. 16, 1989

Related U.S. Application Data

[63] Continuation of Ser. No. 063,368, Jun. 18, 1987, abandoned.

[51] Int. Cl.$^5$ .............................................. G21C 19/32
[52] U.S. Cl. ...................................... 376/261; 376/272
[58] Field of Search ....................... 376/261, 260, 272; 414/146

[56] References Cited

U.S. PATENT DOCUMENTS

| | | | |
|---|---|---|---|
| 4,441,242 | 4/1984 | Hicken et al. | 376/261 |
| 4,446,098 | 5/1984 | Pomaibo et al. | 376/261 |
| 4,474,727 | 10/1984 | Kmonk et al. | 376/272 |
| 4,619,808 | 10/1986 | Formanek | 376/272 |
| 4,636,351 | 1/1987 | Rohr | 376/272 |
| 4,649,017 | 3/1987 | Couture | 376/261 |
| 4,650,641 | 3/1987 | Formanek | 376/272 |
| 4,659,536 | 4/1987 | Baudro | 376/261 |
| 4,673,544 | 6/1987 | Rohr | 376/261 |
| 4,704,247 | 11/1987 | Wachter | 376/261 |
| 4,714,583 | 12/1987 | Wachter | 376/261 |
| 4,723,358 | 2/1988 | Jung et al. | 376/261 |
| 4,723,359 | 2/1988 | Blissell et al. | 376/261 |
| 4,724,607 | 2/1988 | Beuneche et al. | 376/272 |
| 4,724,636 | 2/1988 | Tolino | 376/260 |

FOREIGN PATENT DOCUMENTS

| | | |
|---|---|---|
| 0128236 | 12/1984 | European Pat. Off. . |
| 0140025 | 5/1985 | European Pat. Off. . |
| 0244278 | 11/1987 | European Pat. Off. ............ 376/261 |
| 12898 | 1/1986 | France . |
| 04454 | 6/1983 | Int'l Pat. Institute . |
| 0218996 | 12/1984 | Japan .................................. 376/261 |

OTHER PUBLICATIONS

"Fuel Reconstitution and Repair", NEI, Stavsky et al., 12/87.
Conceptual Design Report, vol. I, Book I–Design Description Executive Summary, Apr. 1985, Westinghouse Electric Corp., (pp. 16–17).
Conceptual Design Report, vol. I, Book II–Design Description, Apr. 1985, Westinghouse Electric Corporation, (pp. 2-22-2-26).
PWR and BWR Conceptual Spent Fuel Consolidation Equipment For A Monitored Retirevable Storage Facility, 12/17/84.

Primary Examiner—Daniel Wasil

[57] ABSTRACT

A system and a method for removing and consolidating the spent fuel rods of a fuel assembly is disclosed herein. The sytem comprises a pushing assembly having a push rod for pushing a selected fuel rod out of a fuel assembly, a fuel assembly positioner including an elevator for conveniently positioning a fuel assembly within the spent fuel pool of a nuclear facility, a rod catching grid for preventing the pushed-out fuel rods from falling to the bottom of the pool and a transition cannister for funneling the rods into a consolidated arrangement within a storage cannister. In operation, the push rod is positioned over and engaged against the upper end of a fuel rod to be removed from the assembly. Thus engaged, the push rod is inserted through the cells in the grids of the fuel assembly that surround the selected fuel rod, thereby pushing it out of the fuel assembly. Thus the grid cells are used as an alignment means for the push rod during the rod-pushing operation.

13 Claims, 7 Drawing Sheets

SYSTEM AND METHOD FOR REMOVING AND CONSOLIDATION FUEL RODS OF A NUCLEAR FUEL ASSEMBLY

This application is a continuation of application Ser. No. 07/063,368 filed June 18, 1987, now abandoned.

BACKGROUND OF THE INVENTION

1. Field of the Invention

This invention concerns both a system and a method for removing the spent fuel rods from a fuel rod assembly, and consolidating these rods into a maximum density array within a storage cannister.

2. Description of the Prior Art

Tooling systems for removing the fuel rods from a nuclear fuel rod assembly are known in the prior art. Such tools are often used to remove the spent fuel rods from a fuel rod assembly so that they may be consolidated into a storage cannister, and ultimately placed in the spent fuel pool of the nuclear power plant facility. To this end, such tooling systems typically include a rod gripping mechanism for selectively gripping and ungripping one or more fuel rods in a fuel rod assembly after the top nozzle of the assembly has been removed. Such rod gripping mechanisms are connected to a crane-like mechanism and operate by lifting the rods out of the assembly by applying a tensile or pulling force, and lowering them into a storage cannister. An example of such a fuel rod gripping mechanism is disclosed and claimed in U.S. patent application Ser. No. 564,053 filed Dec. 21, 1983 by Edward Shields and assigned to the Westinghouse Electric Corporation. While such fuel rod removal systems are most commonly used in the context of spent fuel consolidation processes, they may also be used to remove the unspent fuel rods from a damaged fuel rod assembly incident to a reassembly-type repair.

Unfortunately, the performance of tooling systems that remove the fuel rods from their respective assemblies by gripping and pulling them out is not without shortcomings. However, before these shortcomings may be fully appreciated, some brief background and to the structure, operation and environment of such fuel rod assemblies is necessary.

Nuclear fuel rod assemblies generally comprise between 200 and 290 fuel rods mounted in a square array within a support skeleton. The support skeleton in turn is formed from top and bottom nozzles which are interconnected to one another by sixeen to twenty-four uniformly arrayed thimble tubes. The top and bottom nozzles are eight to nine inches square, and the thimble tubes are about thirteen feet long, so that the overall shape of the fuel assembly is that of an elongated, rectangular prism (see FIG. 1). The fuel rods themselves are about twelve feet long. In order to equidistantly space the long and relatively flimsy fuel rods within the support skeleton, the skeleton includes between seven and nine grids, each of which has a square array of open cells for receiving and spacing the fuel rods. The grids are usually formed from flat plates of interlocking sheet metal in an 'eggcrate' configuration which lends compressive strength to the grids with a minimum of weight. When such fuel assemblies are first placed into operation, they are lowered into the reactor core by a crane, and the neutron-absorbing control rods which are interspersed between the fuel rods are slidably removed. Pressurized water is then conducted through the bottom nozzles of the fuel assemblies in order to uniformly absorb the heat generated by the nuclear reaction that takes place between the fuel rods. Over a period time, the nuclear fuel within the fuel rods becomes exhausted, thereby necessitating the removal of the spent fuel assembly from the nuclear core, and the disposal of its fuel rods in the spent fuel pool of the nuclear power plant facility. However, in order to make optimum use of the limited amount of storage space available in the spent fuel pool, the spent fuel assembly is first taken to a cask loading area of the pool for consolidation. The cask loading area of the pool is approximately forty feet deep, and filled with water. The water shields workers who typically stand on a deck located above the pool from radiation. Once the spent fuel assembly is loaded into the cask loading shaft, the workers remove at least the top nozzle of the assembly, and then utilize a gripping device (such as that disclosed in the previously mentioned U.S. patent application Ser. No. 564,053) to grip and withdraw all of the spent fuel rods from the fuel assembly in order to load these rods into a storage canister. Because of the relatively low thermal output of spent fuel rods, empirical studies have shown that they may be packed in parallel in contact with one another in a "triangular" array (shown in cross-section in FIG. 4E), which is the densest possible arrangement for a plurality of rod-like objects. In such an arrangement, the axes of rotation of the rods (when viewed in plan cross-section) appear to define the corners of equilateral triangles; hence the name "triangular" array. The triangular arrangement of spent fuel rods advantageously reduces the volume that these rods occupied within the fuel assembly by a factor of 50%, which in turns allows the spent fuel pool to hold over twice as many spent fuel rods. While prior art tooling systems are known which are capable of effectively removing and consolidating the fuel rods from spent fuel assemblies into storage cannisters, the operation of such tooling systems is not without its costs and risks. For example, the gripping, raising and lowering of spent fuel rods from such assemblies is a slow and tedious process. While the water in the cask loading area of the pool does afford an effective shield for the majority of radiation emanating from the fuel being consolidated, the workers on the deck still receive some amount of potentially hazardous radiation largely due to the length of time necessary to complete the consolidation operation. Additionally, the tensile forces applied to the spent fuel rods when they are being forcefully pulled out of the grids of the fuel rods assembly can cause the relatively brittle outer tube of Zircaloy ® cladding to break, thereby contaminating the water in the spent fuel pool with pellets of radioactive uranium oxide. Finally, the complete withdrawal of the spent fuel rods from the fuel assembly requires these rods to be hoisted upwardly within the spent fuel cask at least fifteen feet. If any of the gripper mechanisms holding the rods should slip at this juncture, one or more of the rods could fall to the bottom of the pool, and break.

Clearly, a system for removing fuel rods from a fuel rod assembly is needed that is both faster and safer than prior art systems. Ideally, such a fuel rod removal system should be adaptable to any size or type of fuel rod assembly now in commercial use. Finally, it would be desirable if such a system were mechanically simple yet extremely reliable despite the differences in sizes of the individual fuel rods so as to minimize the occurrence of broken fuel rods during the fuel consolidation operation.

SUMMARY OF THE INVENTION

Generally speaking, the invention is both an improved system and a method for removing and consolidating the fuel rods of a fuel rod assembly of the type having a plurality of grids for holding and spacing the rods within the assembly, wherein each grid includes an array of rod-receiving cells that surrounds and retains a fuel rod. The system of the invention comprises a pushing assembly that includes a push rod for pushing a selected rod out of each of the grid cells that receives and retains it. The push rod may include a distal end having an engagement means for engaging the end of a selected rod. In the preferred embodiment, the engagement means includes a recess for receiving the tapered end of a fuel rod. To facilitate the insertion of the push rod through the cells of the grids, the diameter of the push rod is preferably made smaller than the diameter of the selected fuel rod. Additionally, the push rod may have a relatively stiffer structure than the Zircaloy ® tube that forms the exterior of a fuel rod. In the preferred embodiment, a rod of solid stainless steel is used.

In order to selectively extend and retract the push rod through the cells of the grids, the pushing assembly may have a drive means formed from a rack mounted on the distal end of the push rod, a pinion that meshes with the rack, and a reversible motor means for driving the pinion. In the preferred embodiment, the motor means is an off-the-shelf, air powered nut runner. In order to properly position the push rod over a selected fuel rod, the pushing assembly may further include an indexer having an X-axis table and Y-axis table that are slidably movable with rspect to a baseplate. The indexer may further have X and Y positioning mechanisms formed from a manually rotatable threaded rod engaged to a bore in each table so that the tables may be moved in "riding nut" fashion in order to accurately position the push rod. The system of the invention may further include an elevator for lifting and lowering a fuel rod assembly to a convenient work position. This elevator preferably includes a carriage with a basket that is rotatably mounted thereon for receiving and holding a fuel assembly, as w ell as an inverting mechanism for selectively inverting the basket to provide ready access to the top and bottom nozzles of the fuel assembly, thereby facilitating their removal. To prevent the pushed out rods from sliding completely through the bottom of the fuel assembly and falling onto the floor of the spent fuel pool, the system may also include a rod catching means in the form of a grid having a plurality of rod-receiving cells, each of which includes spring clips for frictionally engaging any rod received therein.

To compactly arrange the pushed-out fuel rods, the system may further have a transition cannister that funnels the rods into a compact triangular arrangement. The transition cannister preferably includes an inlet end having a plurality of rod guiding tubes alignable with the cells of the grid that forms the rod catching means, and an outlet end where the rod guiding tubes are gathered together in a close array. The gathered ends may be swaged to allow them to be more closely engaged with respect to one another. Additionally, guide wires may be welded along the bottom ends of the guide conduits for guiding the fuel rods that pass through the transition cannister into as closely packed an array as possible. The transition cannister is capable of consolidating either one fuel rod, or a plurality of such fuel rods simultaneously.

The bottom of the transition cannister may be formed from a detachable alignment plate that cooperates with the tapered shape of the transition cannister to consolidate the pushed-out rods into a densely packed array. This plate preferably includes a plurality of closely arrayed recesses for receiving the bottom tapered ends of the pushed out fuel rods as they are conducted through the guide tubes of the transition cannister.

In the method of the invention, the alignment plate is positioned into alignment over the top open end of a storage cannister. In one of the preferred methods of the invention, the alignment plate is detached from the bottom of the transition cannister and lowered into the open upper end of the storage cannister. The weight of the rods causes them to slide downwardly along with the alignment plate until this plate arrives at the lower end of the storage cannister. In this preferred method, resilient rollers may be used to engage and push the peripherally located fuel rods down into the storage cannister. In a second method of the invention, the storage cannister and the transition cannister are mounted onto a vertically movable alignment frame, while the alignment plate is held stationary. When this particular method is used, the system may further be provided with a rod clearing assembly formed from a plurality of clearing rods that serve to push out any fuel rods that bind or otherwise become stuck in the transition cannister. The fuel rod removal system of the invention is capable of removing and consolidating fuel rods from a fuel assembly in a safer and more reliable manner than prior art tooling systems, since the fuel rods are subjected to compressive rather than tensile forces, and further since the fuel rods are not lifted upwardly at any point during the operation of the system, but rather are continually conducted downwardly toward the bottom of the spent fuel pool. Most importantly, the system removes and consolidates such fuel rods at a faster rate than known prior art systems, thereby minimizing the amount of radiation the operators are exposed to, and is operable by means of a mechanical system that is simpler and more reliable than known prior art systems.

DETAILED DESCRIPTION OF THE PREFERRED EMBODIMENT

General Description of the Structure, Purpose and Method of the Invention

Figure 1:
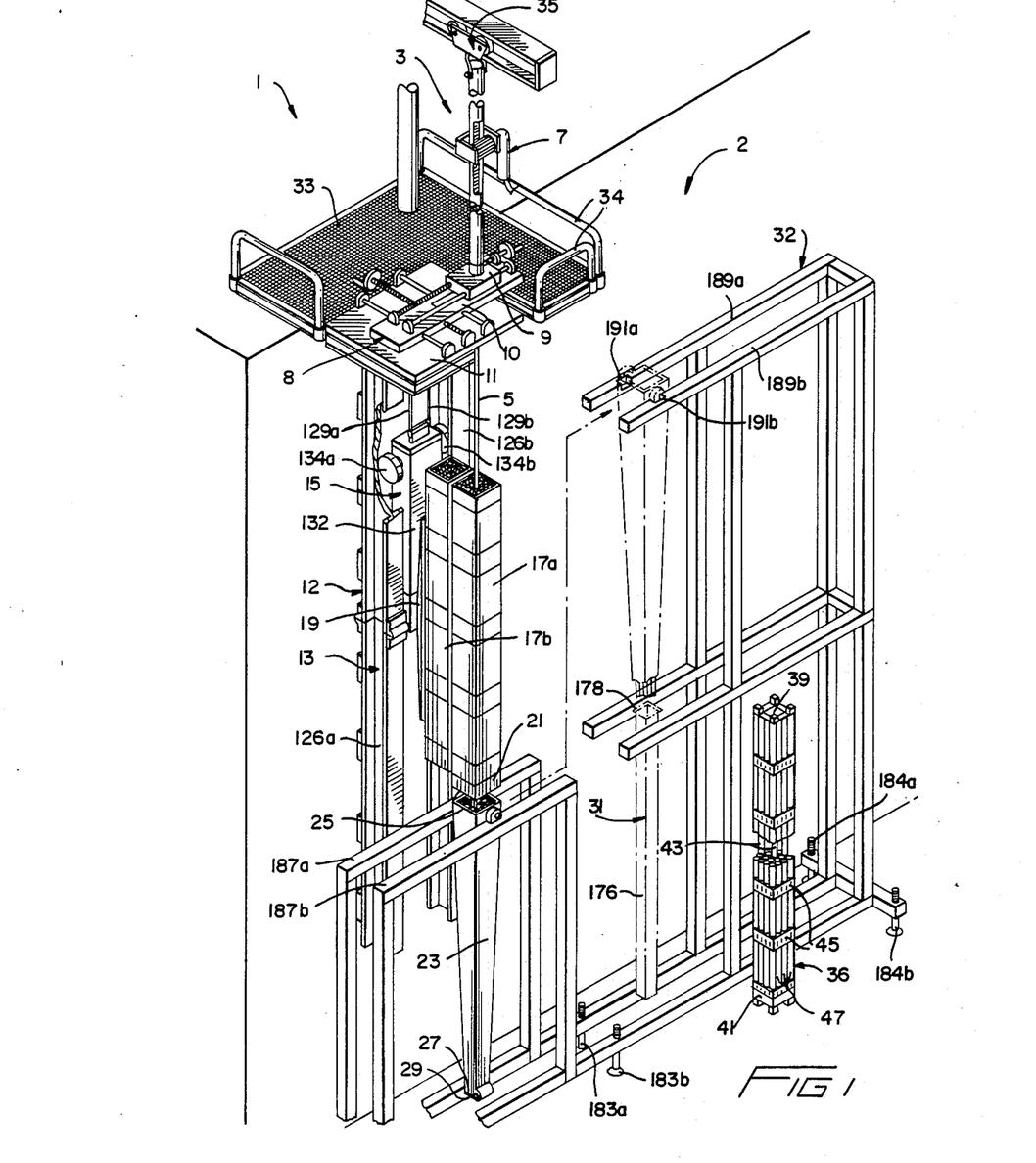
FIG. 1 is a perspective view of the overall system of the invention.

FIG. 1 illustrates the principal components of the fuel rod removal and consolidation system 1 of the invention as it would appear installed in the cask loading area of a spent fuel pool 2 in a nuclear power facility. This system 1 generally comprises a rod pushing assembly 3 for pushing the fuel rods out of a fuel assembly, a fuel assembly positioner 12 for vertically placing a fuel assembly into a convenient work position with respect to the rod pushing assembly 3, a rod-catching grid 21 for catching the fuel rods pushed out of the fuel assembly, and a transition cannister 23 for funneling the fuel rods into a consolidated configuration within a storage cannister 31.

The rod pushing assembly 3 is formed from a push rod 5 (which may be single, dual or multiple), a motorized driving mechanism 7 for selectively extending or retracting the push rod 5, and an indexer 8 formed from a movable X-axis table 9, a movable Y-axis table 10, and a stationary base plate 11 for placing the rod-engaging end of the push rod 5 over a selected fuel rod in a fuel rod assembly.

The fuel assembly positioner 12 includes an elevator 13 having a vertically movable carriage 15 that in turn has two rectangular baskets 17a and 17b rotatably connected to the carriage 15 by means of a shaft. The rectangular interior of the baskets 17a and 17b is dimensioned to contain a fuel rod assembly with a minimum amount of slack space. The fuel assembly positioner 12 further includes a basket inverter mechanism 19 that includes a gear train having a worm gear connected to a drive rod (not shown) for rotating the rotatable shaft that connects the baskets 17a and 17b to the carriage 15. The basket inverter mechanism 19 makes it possible to selectively invert the fuel assemblies contained therein. As will be described in more detail hereinafter, the ability to invert the fuel assemblies greatly facilitates the removal of the top and bottom nozzles disposed on either end of the fuel assemblies, thereby allowing access to the fuel rods contained therebetween.

The rod-catching grid 21 is detachably connectable to the bottom of either or both of the baskets 17a and 17b of the fuel assembly positioner 12 after the top and bottom nozzles have been removed from the fuel assembly contained therein. The purpose of the rod-catching grid 21 is to apply a drag force onto the rods as they are pushed out of their respective fuel assembly downwardly toward the floor of the spent fuel pool 2 so that they will not fall onto the hard concrete floor of the pool 2 and and become damaged. To this end, the rod-catching grid includes an array of rod-receiving cells, each of which has one or more spring clips for frictionally engaging a fuel rod as it is pushed through the cell.

The transition cannister 23 of the system 1 includes an inlet end 25 for receiving the fuel rods pushed out of the fuel assemblies and through the rod-catching grid 21, as well as an outlet end 27 that is preferably covered by a removable alignment plate 29 for funneling these fuel rods into a storage cannister 31 in a compact, consolidated arrangement. As will be described in more detail hereinafter, the transition cannister 23 achieves its purpose by means of a converging array of guide tubes whose upper open ends are in alignment with the cells of the rod-catching grid 21.

To facilitate the positioning of the transition cannister 23 during the fuel rod removal operation, the system 1 further includes a frame 32 having upper and lower parallel rails. The lower rails hold the transition cannister 23 under either of the baskets 17a, 17b during the operation of the pushing assembly 3, and the upper rails support the cannister 23 over the storage cannister 31 after all of the fuel rods have been completely pushed out of a particular fuel rod assembly. Finally, the system 1 includes a work platform 33 for accommodating a system operator. The platform 33 preferably has one or more hand rails 34 for preventing workers from accidentally falling into the spent fuel pool 2, as well as a trolley-type crane 35 for positioning the fuel assembly positioner 12, the cannister 23, storage cannister 31 and frame 32 in place in the pool 2 during the initial installation thereof.

The general purpose of the system 1 is to remove and to consolidate the spent fuel rods from a fuel assembly 36 through a pushing rather than a pulling action. Such fuel assemblies 36 generally include a support skeleton formed from a top nozzle 39 that is connected to a bottom nozzle 41 by means of an array of thimble tubes 43. Uniformly spaced along the longitudinal axes of the thimble tubes 43 are a plurality of grids 45. Each grid 45 is in turn formed from a plurality of interlocking rectangular pieces of sheet metal formed in an "egg crate" arrangement to define a gridwork of rod receiving square cells. These rod-receiving cells serve to support and to uniformly space the fuel rods 47 of the assembly 36 which are captured between the top and bottom nozzles 39, 41.

In the method of the invention, the top nozzles 39 are removed from two fuel assemblies 36. These assemblies 36 are then lifted upwardly from the floor of the pool 2 and inserted into the baskets 17a, 17b of the fuel assembly positioner 12. Top caps (shown in FIGS. 6A and 6B) are detachably mounted over the tops of the baskets 17a, 17b and both baskets are rotated 180° by the basket inverting mechanism 19. The bottom caps (shown in FIGS. 6A and 6B) are then removed, thereby affording the system operator access to the bottom nozzles 41 of each of the fuel assemblies 36. The system operator removes the bottom nozzle 41 from each fuel assembly 36 by means of a long-handled wrench. He then detachably connects a rod-catching grid 21 over the bottom end of each basket 17a, 17b of the fuel assembly 36, and re-positions the assembly 36 into an upright position by rotating the baskets 17a, 17b 180° via the basket inverter mechanism 19. The top caps of each basket 17a, 17b are next swung open, thereby affording access to the fuel rods 47 of each assembly 36. The transition cannister 23 is then placed into a position directly underneath the rod-catching grid 21 of one of the baskets 17a, 17b as illustrated in FIG. 1.

The system operator 1 now begins to remove the spent fuel rods 47 from the fuel assembly 36. This is accomplished by placing the distal end of the push rod 5 over a selected fuel rod by turning the handles on the X-axis table 9 and Y-axis table 10 of the indexer 8. Once the push rod 5 is placed over a selected fuel rod 47, the driving mechanism 7 is actuated in order to extend the push rod 5 downwardly, thereby pushing the fuel rod 47 out of each of the rod-receiving grid cells that surrounds it within the assembly 36. As this occurs, the fuel rod slides through the rod-catching grid 21, and into an open end of a guide tube located in the inlet end 25 of the transition cannister 23, where it is ultimately funneled toward the relatively smaller outlet end 27.

The method is repeated until all of the fuel rods 47 are pushed completely out of the support skeleton of the fuel assembly 36 contained within the basket 17a.

Figure 6A:
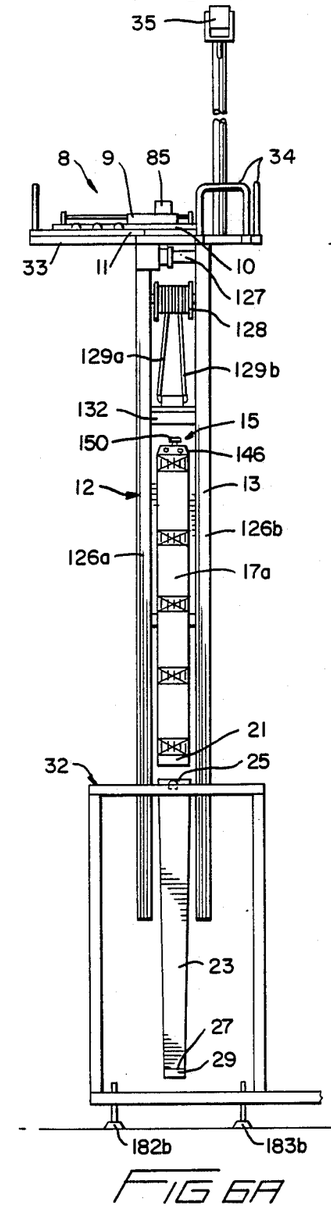
FIG. 6A is a front view of the fuel assembly positioner of the system, illustrating how the baskets of the positioner hold a fuel assembly over both the rod-catching grid and the transition cannister of the system.
Figure 6B:
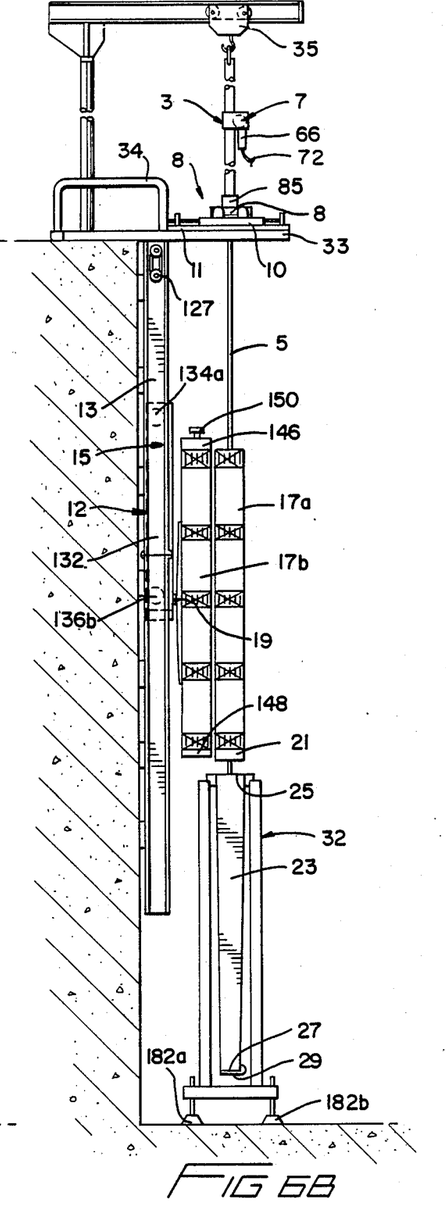
FIG. 6B is a side view of the fuel assembly positioner, the rod-catching grid, the transition cannister, and the pushing assembly of the system.
Figure 6C:
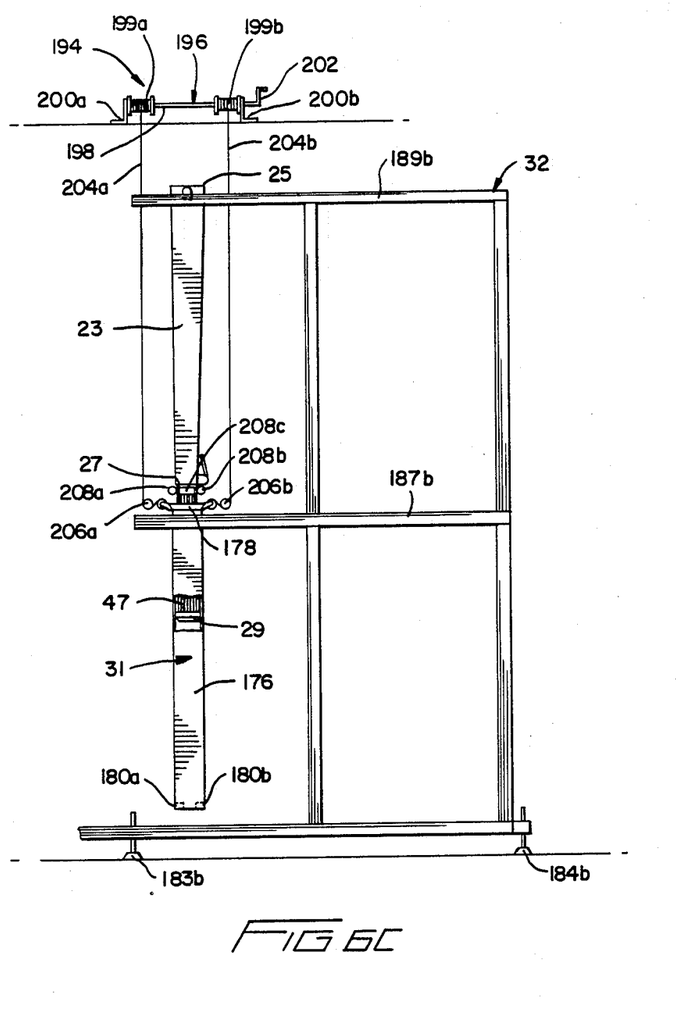
FIG. 6C illustrates how the fuel rods loaded into the transition cannister may be loaded into a fuel rod storage cannister in accordance with one method of the invention wherein the detachable alignment plate of the transition cannister is lowered into a storage cannister and is used to form the bottom of the storage cannister.

In one method of the invention shown in FIG. 6C, the crane 35 is then used to lift the transition cannister 23 into the position illustrated in phantom in FIG. 1, with the outlet end 27 over the top open end of a storage cannister 31. The alignment plate 29 that covered the bottom of the transition cannister 23 is then lowered into the open end of the storage cannister 31 by means of an alignment plate lowering mechanism 194 (illustrated in FIG. 6C). The alignment plate lowering mechanism 194 has four orthogonally disposed resilient rollers 208a, 208b and 208c (208d not being shown) for engaging and pushing down the peripherally located rods as the alignment plate 29 is lowered in order to prevent these fuel rods from binding during this loading operation. In another method of the invention shown in FIGS. 7A and 7B, the crane 35 is used to lift the transition cannister 23 into the upper portion of alignment frame 210 over a storage cannister 31. The alignment plate 29 is detached from the bottom of the transition cannister 23 and attached to a support column 220. The alignment frame 210 is vertically lifted into the position illustrated in FIG. 7B while the alignment plate 29 is held stationary in order to draw the open end of the storage cannister over the fuel rods 47. A rod clearing assembly 232 having a plurality of clearing rods 234 may be provided over the transition cannister 23 to prevent any fuel rods 47 from binding or otherwise becoming stuck.

In both methods, the alignment plate 29 is left in the storage cannister 31 to form the bottom plate thereof in order to save time. While the fuel rods 47 are being loaded into the storage cannister 31 from the transition cannister 23, another transition cannister (not shown) is preferably placed under the basket 17b, so that the system operator may commence the rod pushing operation with respect to another fuel assembly 36. At the completion of the method, the spent fuel rods 47 of both assemblies are consolidated into a storage cannister 31 in a compact, triangular arrangement that takes up only about one-half as much volume as the arrangement of the fuel rods 47 within either of the fuel assemblies 36.

Specific Description of the System Components and Method Steps of the Invention

Figure 2A:
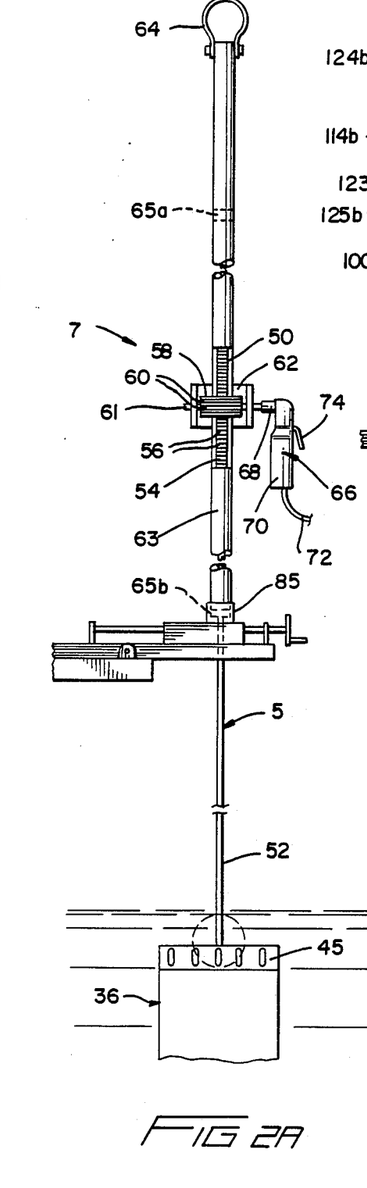
FIG. 2A is a front view of the pushing assembly of the system.
Figure 2B:
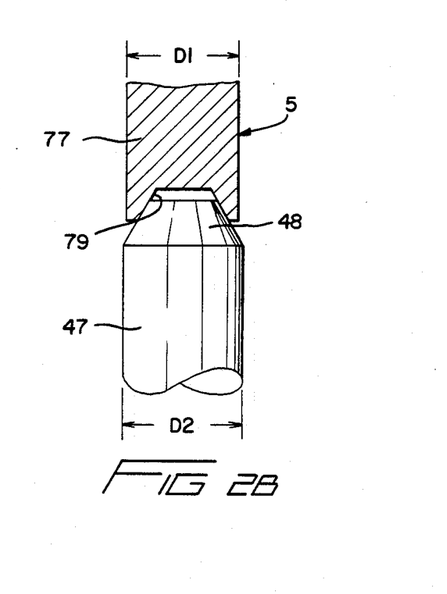
FIG. 2B is an enlarged view of the rod-engaging tip of the push rod of the pushing assembly shown in FIG. 2A.
Figure 2C:
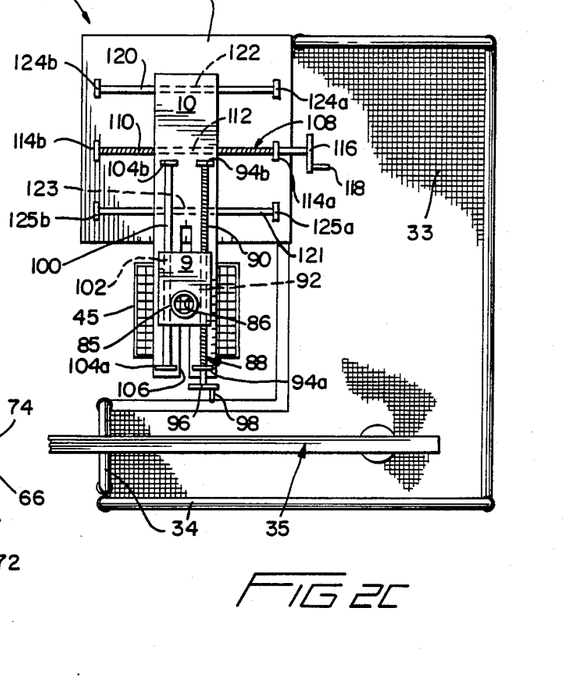
FIG. 2C is a plan view of the indexer used to position the push rod over a selected fuel rod in a fuel rod assembly.

With reference now to FIGS. 2A, 2B and 2C, the pushing assembly 3 of the system 1 includes a proximal end 50 located above the indexer 8, and a distal end 52 located below the indexer 8. The previously mentioned driving mechanism 7 includes a rack 54 that is welded or otherwise connected along the longitudinal axis of the proximal end 50 of the rod 5. The rack 54 includes a plurality of uniformly spaced gear teeth 56. A pinion 58 having gear teeth 60 which mesh with the teeth 56 of the rack 54 is also included. An axle 67 extends through the axis of rotation of the pinion 58. Axle 61 is rotatably mounted across the legs of a U-shaped bracket 62. Bracket 62 is in turn connected to a tubular housing 63 which houses the proximal end of the push rod 5. The tubular housing 63 terminates on its upper end in a lanyard 65 that may be engaged to the hook of a crane, such as crane 35. Housing 63 further includes an upper and a lower guide bushing 65a, 65b for maintaining the proximal end 50 of the rod 5 in concentric alignment within the housing 63. A reversible motor 66 is coupled to the pinion 58 in order to extend and retract the push rod 5. In the preferred embodiment, the reversible motor 66 may be any one of a number of commercially available nut drivers having an output shaft 68, an air motor 70, a hose 72 for conducting compressed air to the motor 70, and a control handle 74.

The distal end 52 of the push rod 5 includes an engagement tip 77 for engaging the end of a selected fuel rod 47. In the preferred embodiment, the engagement tip 77 has a frustroconical recess 79 that is complementary in shape to the tapered end 48 of a fuel rod 47. The provision of such a complementary recess 79 prevents the push rod from slipping off the end of the fuel rod 47 during the pushing operation. Additionally, the diameter D1 of the distal end 52 of the push rod 5 is preferably smaller than the diameter of the fuel rod D2 to prevent the rod 5 from grazing the sides of the rod-retaining cells of the fuel assembly grids 45. Finally, the push rod 5 is preferably formed from a material that is substantially stiffer than the Zircaloy ® that forms the tubular casing of most fuel rods 47, such as solid No. 307 stainless steel. A push rod 5 formed from such a relatively stiff structure will resist side-to-side flexing during the pushing operation which could cause the distal end 52 of the push rod 5 to unnecessarily graze against the rod-receiving cells of the fuel assembly grids 45. While many configurations of engagement tip 77 are possible, the use of a complementary, frustroconical recess 79 provides a structure that is capable of coupling itself onto the tapered end of a fuel rod 47 during the power stroke of the pushing operation, but yet completely uncoupling itself from the tapered end 48 when the push rod is withdrawn following the completion of the pushing stroke. The smooth tip 77 further helps prevent it from binding or scraping against any of the rod-receiving cells of the fuel assembly grids 45 during both the push stroke and return stroke of the push rod 5. The pushing assembly 3 may include two or more push rods 5 in order to expedite the rod-removal portion of the fuel consolidation method of the invention. In such an alternative embodiment of the pushing assembly 3, two or more push rods 5 arranged in parallel could be connected to a single driving mechanism 7. To maintain the rods in parallel, a plate (not shown) having two or more guide bores could be mounted by way of a bracket beneath the X-axis table 9 of the indexer 8.

FIG. 2C illustrates the indexer 8 of the pushing assembly 3. The X-axis table 9 of the indexer 8 includes a mounting sleeve 85 for receiving the bottom end of the tubular housing 63 of the driving mechanism 7. A sliding, telescopic fitting between the bottom end of the tubular housing 63 and the mounting sleeve 85 of the positioner 8 is preferred, for two reasons. First, such a vertically movable joint between the driving mechanism 7 and the indexer 8 helps to prevent the reversible motor 66 from inadvertently bending and breaking a fuel rod 47 in the event of a misalignment between the rod 5 and the fuel rod 47. Gravity will normally act to secure the driving mechanism 7 within the sleeve 85 of the indexer 8. But if the rod 5 should begin to bind or otherwise encounter an abnormal amount of resistance during the pushing operation, the bottom end of the housing 63 will ride up within the sleeve 85, thereby notifying the system operator of a malfunction condition. Secondly, the use of such a simple, telescopic joint between these two elements of the system 1 also expedites and facilitates the initial set-up of the pushing assembly 3 within the spent fuel pool 2.

The X-axis table 9 of the indexer 8 includes an X-axis positioning mechanism 88 formed from a threaded rod 90 that is engaged within a threaded bore 92 in the table 9. This threaded rod 90 is rotatably mounted along the longitudinal axis of the X-axis table 9 by means of a pair of mounting brackets 94a and 94b. A handle 96 having a spindle 98 is provided at one end of the threaded rod 90. When the system operator turns the spindle 98 either clockwise or counterclockwise, the X-axis table 9 slides across the Y-axis table 10 either toward or away from the handle 96. To assist the system operator in moving the X-axis table 9 from one grid cell to another, a scale with index lines corresponding to grid cell locations is provided across the lower, righthand side of the table 9 as shown. To ensure a smooth, sliding movement along the longitudinal axis of the Y-axis table 10, the X-axis positioning mechanism 88 also includes a guide rod 100 that extends through a smooth bore 102 in the X-axis table 9 that is parallel to the threaded bore 92. The guide rod 100 is mounted across the Y-axis table 10 by means of mounting brackets 104a, 104b. Finally, the X-axis table 9 includes a guide slot 106 located directly under the mounting sleeve 85 for allowing free passage of the push rod 5.

The Y-axis table 10 likewise includes a Y-axis positioning mechanism that is analogous in structure to the previously described X-axis positioning mechanism 88. Basically, the mechanism 108 is formed from a threaded rod 110 that is engaged to a threaded bore 112 that is orthogonally disposed with respect to the threaded rod 90 of the X-axis positioning mechanism 88. This threaded rod 110 is rotatably mounted onto mounting brackets 114a and 114b as shown, and includes a handle 116 having a spindle 118. The system operator may slidably move the Y-axis table 10 toward or away from the handle 116 by turning the spindle 118 clockwise or counterclockwise. To ensure a non-binding sliding movement between the Y-axis table 10 and the base plate 11, a pair of guide rods 120 and 121 are provided in parallel relationship to the threaded rod 110. These guide rods 120 and 121 extend through bores 122 and 123 located in the positions shown in the Y-axis table 10 and are secured onto the base plate 11 by means of brackets 124a, 124b and 125a, 125b, respectively.

FIG. 1, 6A and 6B illustrate the fuel assembly positioner 12 of the system 1. As mentioned previously, the fuel assembly positioner 12 includes an elevator 13 for vertically moving a carriage 15 to which a pair of baskets 17a, 17b are connected. The elevator 13 includes a pair of parallel guide rails 126a, 126b that are vertically mounted along one of the walls of the cask loading shaft 2. A motor and transmission unit 127 is mounted at the top of the parallel guide rails 126a, 126b just below the work platform 33. The output shaft of the motor and transmission 127 is in turn mechanically connected to a drum 128 capable of reeling in or out a pair of parallel cable lengths 129a, 129b. The ends of these two cable lengths 129a, 129b are connected to the top of the box-like frame 132 of the carriage 15. Carriage frame 132 includes a pair of top wheels and bottom wheels 134a, 134b and 136a, 136b that are captured within the inner flanges of the parallel guide rails 126a, 126b of the elevator 13. Mounted near the bottom of the carriage 15 is the previously mentioned basket inverter mechanism 19, of which only the rotatable shaft 142 is shown. A complete description of the inverter mechanism 19, as well as numerous other details concerning the elevator 13, carriage 15 and baskets 17a, 17b are provided in U.S. patent application Ser. No. 916,682 filed Oct. 8, 1986 for "Improved Reconstitution and Repair System for Nuclear Fuel Rod Assemblies" by Alan Savinell and assigned to the Westinghouse Electric Corporation, the entire specification of which is incorporated herein by reference. The rotatable shaft 142 is mounted onto the rearmost basket 17b by way of a mounting plate 144. Additionally, each of the baskets 17a, 17b includes a top cap 146, and a bottom cap 148 (shown only with reference to basket 17b). In the preferred embodiment, the top and bottom caps 146, 148 are detachably connectable to the baskets 17a, 17b. Additionally, the top cap 146 includes an axial clamp 150 for advantageously removing any slack space that may occur at the top ends of the baskets 17a, 17b after a fuel assembly 36 is loaded therein. The removal of such slack space prevents the fuel assembly from sliding within the baskets 17a, 17b when these baskets are inverted in order to afford access to either the top or the bottom nozzles 39, 41 of the fuel assemblies 36.

Figures 3A, 3B, 5A, 5B:
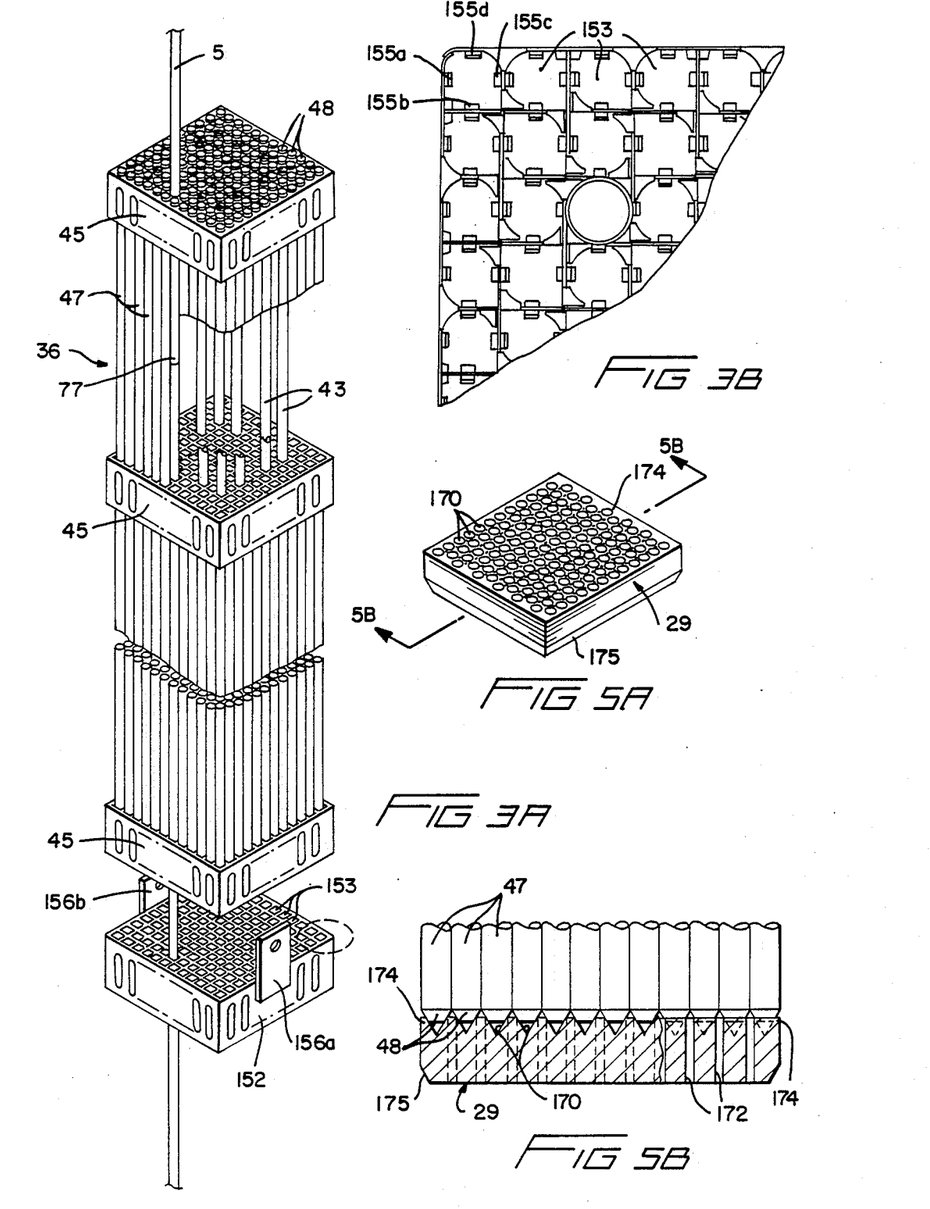
FIG. 3A is a partial perspective view of a fuel assembly whose top and bottom nozzles have been removed, illustrating how the push rod pushes a selected fuel rod out of the fuel assembly and into the rod-catching grid of the system.
FIG. 3B is an enlarged, plan view of the circled corner of the rod-catching grid, illustrating the spring clips that are present in the individual rod-retaining cells of the grid.
FIG. 5A is a perspective view of the alignment plate of the system.
FIG. 5B is a side, cross-sectional view of the alignment plate illustrated in FIG. 5A along the line 5B—5B.

FIGS. 3A and 3B illustrate both the structure and the operation of the rod-catching grid 21 of the system 1. In the preferred embodiment, the rod-catching grid 21 is very similar in structure to the grids 45 used in the fuel assemblies 36. In their interiors, such grids include a plurality of square, rod-receiving cells 153. Each one of the four walls of the cells 153 further includes a spring clip 155a–155d for applying a centering force on any fuel rod 47 inserted within a cell 153. However, unlike the grids 45, the spring clips 155a–155d of the rod-catching grid 21 extend close enough to the centers of their respective cells so that a positive drag force is applied to any fuel rod 47 contained within any one of the cells 153. Hence, when a fuel rod 37 is pushed through a fuel assembly 36 as is shown in FIG. 3A, the rod-catching grid 21 applies a positive retaining force onto the rod 47, thereby insuring that it will not fall and collide with the hard, concrete bottom of the spent fuel pool 2. On the exterior, the catch grid 21 includes a pair of parallel brackets 156a, 156b for detachably mounting it onto the bottom end of the baskets 17a, 17b.

Figure 4A:
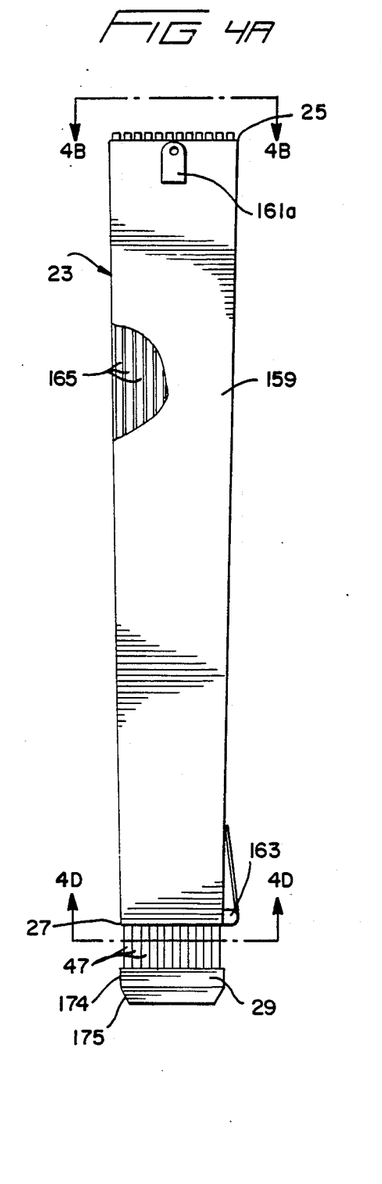
FIG. 4A is a side view of the transition cannister of the system, illustrating how the guides tubes contained therein guide the fuel rods they receive from the rod-catching grid into the alignment plate of the system.
Figure 4B:
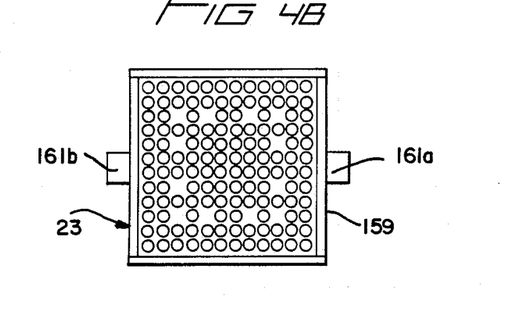
FIG. 4B is a top plan view of the transition cannister illustrated in FIG. 4A.
Figure 4C:
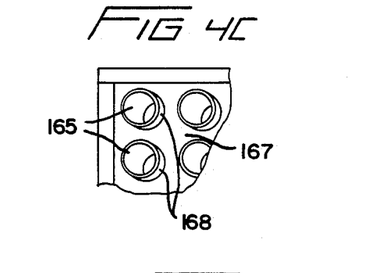
FIG. 4C is an enlarged view of the upper lefthand corner portion of the transition cannister illustrated in FIG. 4B, illustrating the upper ends of the guide tubes of the cannister (without fuel rods)
Figure 4D:
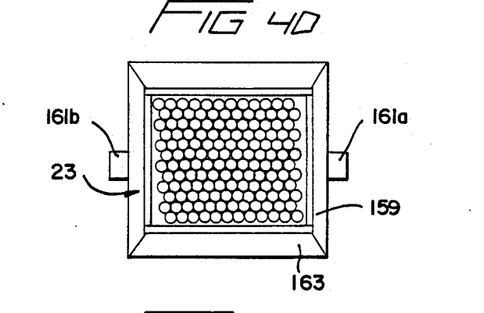
FIG. 4D is a bottom view of the transition cannister along the line 4D—4D in FIG. 4A (shown without the fuel rods)
Figure 4E:
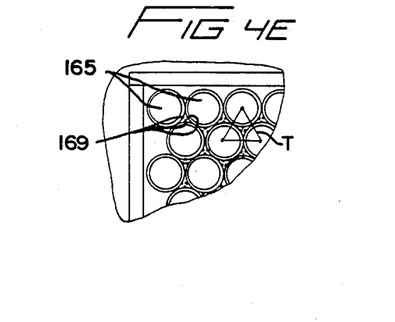
FIG. 4E is an enlarged view of the upper lefthand corner of the transition cannister illustrated in FIG. 4D (also shown without fuel rods)

FIG. 4A, 4B, 4C, 4D and 4E illustrate the transition cannister 23 of the system 1. Generally, the transition cannister 23 is formed from a housing 159 that is square in cross-section but slightly tapered from its top to its bottom so as to form a very shallowly tapered pyramidal structure. A pair of opposing mounting lugs 161a and 161b are preferably mounted at the top end of the housing 159 in the position shown. These mounting lugs 161a, 161b allow the cannister 23 to hang between parallel bars of the frame 32 in the position illustrated in FIG. 1. If desired, small casters (not shown) may be mounted on the bottom ends of the mounting lugs 161 to allow the cannister 23 to be easily rolled along the rails of the frame 32. The bottom end of the housing 159 includes a lower lug 163 that is engageable with the hook of the crane 35. As is shown in FIGS. 4A, 4B and 4C, the transition cannister 23 includes a plurality of rod-guiding tubes 165 for funneling the fuel rods 47 received from the rod-catching grid 21 into a more compact arrangement. At the inlet end 25 of the cannister 23, these guide tubes 165 are arranged in exactly the configuration of the cells 153 of the rod-catching grid 21. To maintain the top ends of the guide tubes 165 in alignment with these cells 153, a grid plate 167 is provided at the top inlet end 25 of the cannister 23. This grid plate 167 includes a plurality of bores 168 for conducting and spacing the upper ends of the guide tubes 165 to the desired arrangement. By contrast, at the outlet end 27 of the of the cannister 23, the bottom ends of the guide tubes 165 are gathered together in the most compact arrangement possible, as is shown in FIGS. 4D and 4E. Such an arrangement is characterized by the fact that the center lines of any three adjacent tube ends form an equilateral triangle T as shown. In order to minimize the space between the bottom ends of the guide tubes 165, each of the bottom ends may be chamfered in a hexagonal pattern. Short, longitudinally oriented lengths of guide wire 168 can be welded onto the bottom edges of these guide tubes 165 in order to provide additional guidance for the fuel rods 47 that slide through the tubes 165 incident to the final loading operation.

FIGS. 5A and 5B illustrate the alignment plate 29 of the system 1. As will be described in more detail with respect to the method of the invention, the alignment plate 29 initially forms the bottom of the transition cannister 23 but ultimately forms the bottom of the storage cannister 31. In both cases, the principal function of the alignment plate 29 is to arrange and to maintain the spent fuel rods 47 in the densest possible configuration. To this end, the alignment plate 29 includes a plurality of frustroconical recesses 170 that are complementary in shape to the tapered ends 48 of the fuel rods 47. These recesses 170 are arranged with a triangular pitch in order to render them alignable with the bottom ends of the guide tubes 165. In order to allow cooling water to circulate through the storage cannister 31 that the alignment plate 29 eventually forms the bottom of, a plurality of cooling bores 172 are provided as indicated. Additionally, the plate 29 is circumscribed by a guide flange 174 in order to assist the plate 29 in remaining level when it is inserted into either the bottom of the transition cannister 29, or through the top open end of the storage cannister 31. The bottom edge of the plate 29 is circumscribed by a taper 175 for facilitating the insertion of the plate 29 through the open end of the storage cannister 31.

FIGS. 1 and 6C illustrate the storage cannister 31, the frame 32, and the guide plate lowering mechanism 194 of the system 1.

The storage cannister 31 is generally formed from a rectangular housing 176 having a square cross section whose inner diameter is approximately the same size as the outlet end 27 of the transition cannister 23. Circumscribing the top edge of the rectangular housing is a guide flange 178. Guide flange 178 coacts with the previously described tapered portion 175 of the alignment plate 29 in facilitating the insertion of the plate 29 into the top end of the cannister 31.

The frame 32 of the system 1 includes three sets of leveling pads 82a, 82b, 83a, 83b and 84a, 84b. Each of these leveling pads may be raised or lowered with respect to the rest of the frame 32 by turning the pad clockwise or counterclockwise. The frame 32 further includes a pair of lower support rails 187a, 187b for supporting the transition cannister 23 in the positions illustrated in FIGS. 6A and 6B. The distance between the parallel support rails 187a, 187b is chosen so that the previously described upper mounting lugs 161 overhang these rails as shown. The frame 32 further includes a pair of parallel, upper support rails 189a, 189b. These rails 189a, 189b are spaced apart in exactly the same manner as the previously described lower support rails 187a, 187b to allow the transition cannister 23 to overlie them as illustrated in FIG. 6C. The upper support rails 189a, 189b further include a pair of lug slots 191a, 191b for securing the transition cannister 23 into a specific location with respect to the guide plate lowering mechanism 194.

The guide plate lowering mechanism 194 is formed from a dual cable reel 196 having an axle and a pair of cable drums 199a, 199b located on either end. The axle 198 is rotatably mounted between a pair of L-shaped brackets 200a, 200b. The handle is attached to one end of the rotatable axle 198 as shown. The cable drums 199a, 199b each have a cable 204a, 204b wound therearound. Each of these cables 204a, 204b are in turn detachably connected to pulley assemblies 206a, 206b which are in turn connected at opposing points to the guide flange 174 of the alignment plate 29. In operation, the system operator turns the handle 202 of the guide plate lowering mechanism 194 after the outlet end 27 of the transition cannister 23 is placed over the top open end of the storage cannister 31. This in turn causes both the alignment plate 29 and the fuel rods 47 contained within the transition cannister to fall into the storage cannister 31 in a configuration of maximum density. The downward movement of the alignment plate 29 is arrested when this plate 29 hits the plate stops 180a, 180b whereupon plate 29 becomes the bottom of the storage cannister 31. In order to ensure that all of the exteriorly located fuel rods 47 will smoothly drop into place into the storage cannister 31, four roller assemblies 208a–208d (of which only 208a, 208b and 208c are shown) may be placed around the outlet end 27 of the transition cannister 23 in the positions illustrated. Each of these roller assemblies 208 includes a resilient roller capable of engaging each of the exterior rows of fuel rods 47. Since the exterior rows of rods 47 are the most canted with respect to the normal, they are the most likely to bind, and the resilient roller of each of the roller assemblies 208a–208d prevents such binding by engaging and imparting a downward force to each exterior row of the rods 47 during the loading operation.

Figure 7A:
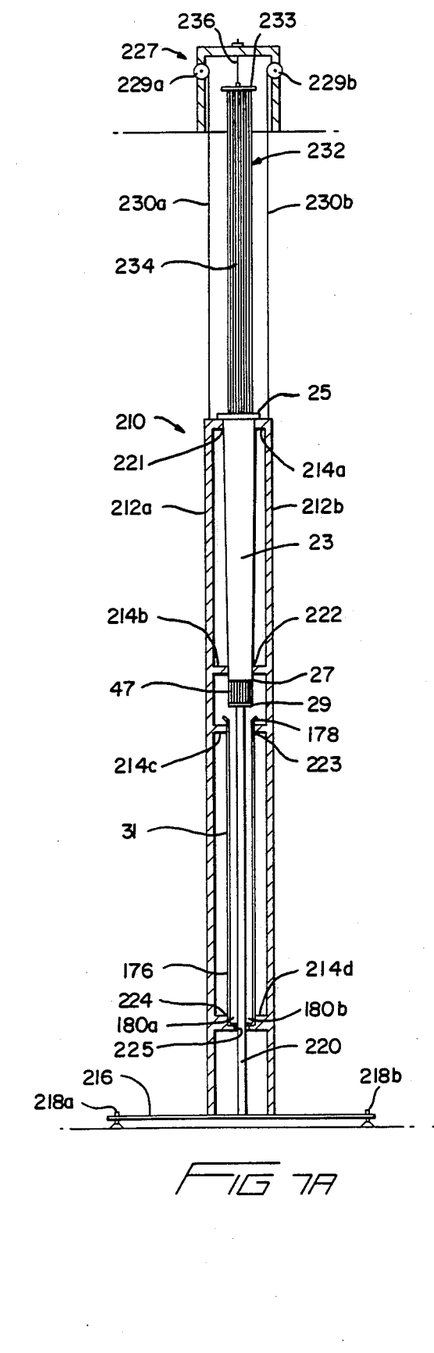
FIGS. 7A and 7B illustrate how these fuel rods may be loaded into a storage cannister in accordance with a second preferred method of the invention wherein the alignment plate is detached from the transition cannister and held stationary while both the transition and storage cannisters are simultaneously lifted by an alignment frame.
Figure 7B:
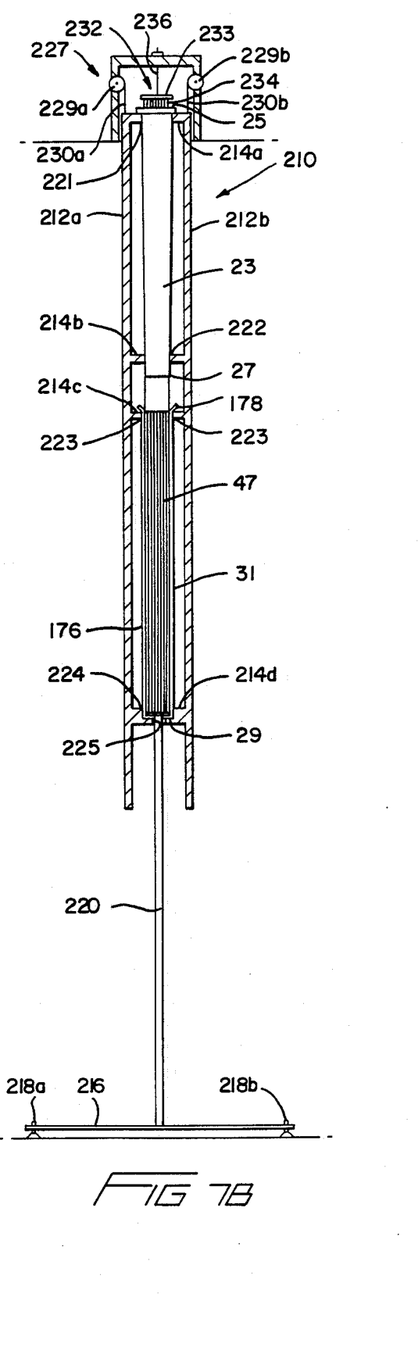

With reference now to FIGS. 7A and 7B, the system 1 of the invention may further include an alignment frame 210 formed from a plurality of vertical frame members 212a, 212b which are held in place by horizontal frame members 214a, 214b, , 214c and 214d . This alignment frame 210 is vertically movable with respect to base plate 216, and may stand onto the base plate 216 as illustrated in FIG. 7A. On its bottom surface, the base plate 216 includes leveling pads 218a, 218b (and two others not shown) at each of its corners for adjusting the position of the base plate 216 with respect to the horizontal. On its top surface, the base plate 216 includes an alignment plate support column 220 at its geometric center. This column 220 stands between the vertical frame members 212a, 212b of the alignment frame 210 as shown. Openings 221, 222, 223 and 224 are provided in the horizontal frame members 214a, 214b, 214c, and 214d, respectively, so that the column 220 will not interfere with any portion of the alignment frame 210 when the frame 210 is moved vertically with respect to base plate 216. More specifically, openings 221 and 222 are dimensioned to accommodate the inlet end 25 and outlet end 27 of transition cannister 23, while openings 223 and 224 are dimensioned to receive the top and bottom ends of a storage cannister 31. In this last regard, it should be noted that the opening 224 includes an offset portion 225 for supporting the lower edge of the storage cannister 31.

The system 1 may further include a separate winch assembly 227 having a pair of cable reels 229a, 229b for extending and retracting a pair of cables 230a, 230b connected to the vertical frame members 212a, 212b of the alignment frame 210. In one of the methods of the invention, this winch assembly 227 is used to vertically lift the alignment frame 210 to the position illustrated in FIG. 7B, thereby drawing the upper open end of the storage cannister 31 over the bottom ends of the fuel rods 47 sliding through the transition cannister 23. To ensure that none of the fuel rods 47 binds or otherwise becomes stuck in its respective guide tube within the transition cannister 23, the system 1 may also include a rod clearing assembly 232 that is formed from a top support plate 223, and a plurality of clearing rods 234 which hang underneath this plate. In the preferred embodiment, the rod clearing assembly 232 has a clearing rod which is insertable within each one of the guide tubes 165 of the transition cannister 23. The entire rod clearing assembly 232 is suspended at the center of the wench assembly 227 by a connecting rod 236.

With reference again to FIGS. 1, 6A and 6B, the first step of the method of the invention includes the removal of the top nozzle 3 9 of a pair of fuel assemblies 36 standing on the bottom of the shaft 2. After this has been accomplished, the elevator 13 is used to lower the carriage 15 to its lowest possible position. The top caps 146 of the baskets 17a, 17b are then removed. The crane 35 is then used to raise and lower a top-nozzleless fuel assembly 36 into each of the baskets 17a, 17b. The top caps 146 are reconnected onto their respective baskets 17a, 17b, and the elevator 13 is used to raise the baskets 17a, 17b upwardly so that their top ends are only about five feet below the level of the water in the shaft 2. The axial clamp 150 on each cap 146 is turned to remove all axial slack space in the baskets 17a, 17b, and the basket inverter mechanism 19 is then used to rotate the baskets, thereby inverting them.

At this juncture, the bottom caps 148 are removed from each of the baskets 17a, 17b, thereby affording easy access to the bottom nozzles 41 of each of the fuel assemblies 36. The bottom nozzles 41 are then removed by unscrewing the hex-head screws (not shown) that typically connect to the thimble tubes 43 of their respective fuel assemblies 36. The bottom nozzles 41 are then removed from their respective baskets. Next, a rod-catching grid 21 is detachably connected onto the bottom end of each basket 17a, 17b by means of the previously described brackets 156a, 156b. After the installation of the rod-catching grids 21 has been accomplished, the basket inverter mechanism 19 is again used to turn the baskets 17a, 17b 180°, thereby placing them back into their original upright orientations. The top cap 146 of each basket containing a fuel assembly is again removed, thereby affording access to the top ends of the fuel rods 47 contained with the fuel assembly 36.

The system operator next installs the pushing assembly 3 of the system 1 onto the work platform 33 in the position illustrated in FIGS. 1 and 6B. The X-and Y-axis positioning mechanisms 88 and 108 of the indexer 8 are then used in the manner previously described to position the engagement tip 77 of the push rod 5 over a desired fuel rod 47 in the assembly contained within basket 17a. The reversible motor 66 of the pushing assembly 3 is next actuated to push the selected fuel rod 47 into the transition cannister 23, and to withdraw the engagement tip 77 back over the top ends of the fuel rods 47. This procedure is repeated until all of the fuel rods 47 of one assembly 36 are pushed into the transition cannister 23. If desired, plural push rods 5 may be provided so that more than one fuel rod 47 may be pushed through the grids 45 of the fuel assembly 36 at one time, thereby greatly contracting the time necessary for the rod removal operation.

After all of the fuel rods 47 have been removed from the fuel assembly 36 in basket 17a, the crane 35 is used to lift the transition cannister 23 from the lower support rails 187a, 187b to the upper support rails 189a, 189b (see FIG. 1). The upper mounting lugs 161a, 161b are inserted into the lug slots 191a, 191b of the upper support rails 189a, 189b, , as illustrated in FIG. 6C. As soon as the crane begins to move the transition cannister 23 out from under basket 17a, another transition cannister 23 (not shown) is positioned under basket 17b that contains the fuel assembly whose rods have not yet been removed, so that the system operator may begin pushing the rods out of their fuel assembly by means of the pushing assembly 3. The use of two such baskets 17a, 17b in the manner described shortens the critical path of the rod removal method when the spent fuel rods of two or more fuel assemblies are to be transferred into a storage cannister 31.

In the method of the invention illustrated in FIG. 6C, the alignment plate 29 that has heretofore formed the bottom of the transition cannister 23 is disconnected from cannister 23 and connected to each of the pulley assemblies 206a, 206b. The system operator rotates the handle 202 of the alignment plate lowering mechanism 194 until the plate 29 abuts against the plate stops 180a, 180b. Simultaneously, the roller assemblies 208a–208d are actuated to ensure that all of the outermost fuel rods 47 are smoothly loaded into the storage cannister 31 in the previously described compact, triangular array. Finally, the alignment plate 29 is disconnected from the pulley assemblies 206a, 206b, and the storage cannister 31 is placed into the spent fuel pool 2 of the facility. In the method of the invention illustrated in FIGS. 7A and 7B, the crane 35 is used to lower the transition cannister 23 through openings 221 and 222 in horizontal frame members 214a, 214b of the alignment frame 210. Prior to such positioning of transition cannister 23, a storage cannister 31 (which may be bottomless) is slid into the alignment frame 210 through openings 223 and 224 in the horizontal frame members 214c, , 214d. As has been previously mentioned, the offset portion 225 of the opening 224 supports the bottom edge of the storage cannister 31 in the alignment frame 210. The alignment plate 23 is next disconnected from the outlet end 27 of the transition cannister 23 and connected onto the alignment plate support column 220. Finally, the crane 35 is used to position the rod clearing assembly 232 into the middle of the winch assembly 227. At this juncture, the operator is careful to make sure that each of the clearing rods 234 of the rod-clearing assembly 232 is properly aligned and perhaps even partially inserted within its respective guide tube 165 in the transition cannister 23. After this has been accomplished, the system operator uses the winch assembly 227 to slowly lift the alignment frame 210 vertically, thereby pulling the upper open end of the storage cannister 31 over both the alignment plate 23, and the bottom ends of the fuel rods 47. As the alignment frame 210 is pulled closer to the winch assembly 227, the clearing rods 234 of the rod clearing assembly 232 extend deeper into the guide tubes 165 of the transition cannister 23. These clearing rods 234 will, of course, apply a positive pushing force to any fuel rods 47 which bind or otherwise become stuck within the transition cannister 23. When the alignment frame 210 is pulled into its uppermost vertical position with respect to the winch assembly 227, the alignment plate 29 rests at the bottom edge of the storage cannister 31 where it is prevented from falling out by plate stops 180a, 180b. The alignment plate 29 is then disconnected from the support column 220, and the loaded storage can 31 is removed from the alignment frame 210, and placed into the spent fuel pool 2 of the facility.

We claim:

1. A system for removing fuel rods from a fuel rod assembly having a plurality of grids that are interconnected by a plurality of thimble rod means, wherein each grid includes an array of rod-receiving cells, at least some of which receive and retain a fuel rod, comprising a pushing assembly for pushing a selected rod out of each of the grid cells that receives and retains it, wherein said pushing assembly includes a push rod having a recess on one of its ends for receiving and engaging the end of a selected fuel rod, the diameter of said push rod being smaller than the diameter of the fuel rod and the shear strength of the push rod being greater than the shear strength of the fuel rod in order to facilitate the insertion of the push rod through the cells of the grids that receive and retain the fuel rod, and a rod catching means mountable under the bottom end of the fuel rod assembly and over a fuel rod consolidating means for frictionally engaging and holding the fuel rods pushed out of the assembly to prevent the fuel rods from freely falling from said fuel rod assembly.

2. A system as defined in claim 1, wherein said push rod includes proximal and distal ends, and wherein said pushing assembly further includes a drive means for selectively extending and retracting the distal end of the push rod.

3. A system as defined in claim 2, wherein said drive means includes a rack mounted on the proximal end of the push rod, a pinion, and a motor means for driving the pinion.

4. A system as defined in claim 1, wherein said pushing assembly further includes an indexing means for positioning the push rod over a selected fuel rod.

5. A system for removing the fuel rods of a vertically oriented fuel rod assembly having a top end, a bottom end, and a plurality of grids disposed between said top and bottom ends, each of which includes an array of rod-receiving cells for receiving and retaining a fuel rod, comprising:

(a) a pushing assembly mountable over the tope end of the fuel rod assembly that includes at least one push rod having a distal end for pushing a selected fuel rod out of the cells of the grids of the assembly, wherein said distal end includes a recess for engaging and receiving the end of a selected fuel rod;

(b) a fuel rod assembly positioner including an elevator and carriage means for lifting, lowering and selectively inverting a fuel rod assembly in order to provide access to the fuel rods in said assembly, and (c) a rod catching means mountable under the bottom end of the fuel rod assembly and over a fuel rod consolidating means for frictionally engaging and holding the fuel rods pushed out of the assembly to prevent said fuel rods from freely falling from said fuel rod assembly.

6. A system as defined in claim 5, further including a transition cannister means having an inlet end for receiving the rods pushed into the rod catching means, and an outlet end for conducting said rods into an array that is denser than the array of the fuel rods within the fuel assembly.

7. A system as defined in claim 6, further including an alignment plate having an array of recesses for receiving the ends of the fuel rods, wherein said recess array corresponds to the denser array of said fuel rods created by said transition cannister means.

8. A system as defined in claim 7, wherein said alignment plate also forms the bottom of a storage cannister.

9. A system as defined in claim 5, wherein said distal end of said push rod of said pushing assembly includes a means for engaging the end of a selected fuel rod, and wherein said pushing assembly further has a drive means formed from a rack mounted along the proximal end of the push rod, a drive pinion that meshes with the rack, and a reversible motor means for driving the pinion to extend and retract said push rod.

10. A system as defined in claim 5, wherein said rod catching means includes a grid having a plurality of rod-receiving cells, and each of said cells includes a rod retaining means that frictionally engages any rod received within the cell.

11. A system as defined in claim 5, wherein said elevator and carriage means includes a carriage, a basket means for receiving and supporting at least one fuel assembly, means for rotatably mounting the basket means onto the carriage, and a basket inverting means for selectively inverting the basket in order to invert the fuel assembly contained therein.

12. A system as defined in claim 9, wherein said pushing assembly has an indexer means for positioning the push rod over a selected fuel rod in the fuel rod assembly that includes means for moving the push rod along first and second axes that are orthogonally disposed with respect to one another.

13. A system for removing and consolidating the fuel rods of a fuel rod assembly having a plurality of grids, each of which includes an array of rod-receiving cells for receiving and retaining a fuel rod, comprising (a) a pushing assembly that includes at least one push rod having a distal end insertable through the cells of the grids of the fuel assembly for pushing a selected fuel rod out of said cells, wherein said distal end terminates in a recessed tip for receiving the end of a fuel rod, a driving mechanism that includes a rack mounted on the proximal end of the push rod, a pinion engaged to said rack, and a reversible motor means coupled to said pinion for extending and retracting the distal end of the push rod, and an indexer means for positioning the push rod over a selected fuel rod in the assembly;

(b) a fuel assembly positioner including an elevator and carriage means for lifting, lowering, and inverting a fuel rod assembly to provide access to the bottom nozzle and fuel rods of the assembly, also including a basket means for receiving and supporting the fuel assembly;

(c) a rod-catching means detachably mountable onto one end of said basket for preventing the fuel rods that are pushed out of the fuel assembly by the push rod from falling including an array of rod-receiving cells;

(d) a transition cannister means for funneling the rods pushed out of the assembly into a compact array having a triangular pitch including an inlet end positioned under the rod-catching means, a plurality of guide tubes whose upper ends are alignable with the rod-receiving cells of the rod-catching means, and whose lower ends are gathered in a dense array having a triangular pitch, and (e) an alignment plate having a plurality of recesses arranged in a triangular array for receiving the ends of the pushed out fuel rods, wherein said plate functions as both the bottom of the transition cannister means and the bottom of a storage cannister.

* * * * *